(12) United States Patent
Richter et al.

(10) Patent No.: US 8,076,259 B2
(45) Date of Patent: Dec. 13, 2011

(54) PROCESS FOR THE PREPARATION OF CATALYST PASTE AND PRODUCTS THEREOF

(75) Inventors: Bodo Richter, Frankfurt (DE); Gregorius Heike, Koblenz (DE)

(73) Assignee: Basell Polyolefine GmbH, Wesseling (DE)

( * ) Notice: Subject to any disclaimer, the term of this patent is extended or adjusted under 35 U.S.C. 154(b) by 90 days.

(21) Appl. No.: 12/733,984

(22) PCT Filed: Oct. 1, 2008

(86) PCT No.: PCT/EP2008/063132
§ 371 (c)(1), (2), (4) Date: Apr. 1, 2010

(87) PCT Pub. No.: WO2009/043867
PCT Pub. Date: Apr. 9, 2009

(65) Prior Publication Data
US 2010/0249345 A1    Sep. 30, 2010

Related U.S. Application Data

(60) Provisional application No. 60/998,401, filed on Oct. 10, 2007.

(30) Foreign Application Priority Data

Oct. 4, 2007    (EP) ..................................... 07117867

(51) Int. Cl.
*C08F 4/6592*    (2006.01)
*B01J 31/14*    (2006.01)
*B01J 31/22*    (2006.01)

(52) U.S. Cl. ........ 502/128; 502/103; 502/120; 502/152; 526/128; 526/129; 526/133; 526/160; 526/943

(58) Field of Classification Search ................. 502/103, 502/120, 152; 526/128, 129, 133, 160, 943
See application file for complete search history.

(56) References Cited

U.S. PATENT DOCUMENTS

| | | |
|---|---|---|
| 6,191,294 B1 | 2/2001 | Resconi et al. |
| 2003/0004052 A1 | 1/2003 | Lynch et al. |
| 2006/0166813 A1 | 7/2006 | Kratzer |
| 2007/0149387 A1 | 6/2007 | Seidel et al. |
| 2007/0155919 A1 | 7/2007 | Okumura et al. |

*Primary Examiner* — Caixia Lu
(74) *Attorney, Agent, or Firm* — Dilworth IP, LLC

(57) ABSTRACT

A process for the preparation of a catalyst paste comprising the following steps:
  a) obtaining a slurry in an organic solvent containing at least:
    a1) a support bearing functional groups;
    a2) a trialkylaluminum of formula $(R^a)_3Al$ wherein $R^a$, equal to or different from each other is a $C^1$-$C^{20}$ hydrocarbon radical optional containing heteroatoms belonging to groups 13-17 of the periodic table of the elements;
    a3) a compound of formula (I)
    $$(R^1)_x\text{-}A\text{-}(OH)_y \qquad (I)$$
    wherein:
    A is an atom of group 13 or 15 of the Periodic Table; $R^1$ equal to or different from each other, are $C_1$-$C_{40}$ hydrocarbon radicals optionally containing heteroatoms belonging to groups 13-17 of the periodic table of the elements; Y is 1 or 2; X is 1 or 2; provided that x+y=3;
    a4) a transition metal organometallic compound;
  b) washing the resulting slurry one or more times with oil.

10 Claims, No Drawings

PROCESS FOR THE PREPARATION OF CATALYST PASTE AND PRODUCTS THEREOF

This application is the U.S. national phase of International application PCT/EP2008/063132, filed Oct. 1, 2008, claiming priority to European Patent Application 07117867.7 filed Oct. 4, 2007, and the benefit under 35 U.S.C. 119(e) of U.S. Provisional application No. 60/998,401, filed Oct. 10, 2007; the disclosures of International application PCT/EP2008/063132, European patent application 07117867.7 and U.S. Provisional application No. 60/998,401, each as filed, are incorporated herein by reference.

The present invention relates to a process for preparing a supported cocatalyst for olefin polymerization, which comprises reacting a support with triethylaluminum and a hydroxyl-containing compound containing an atom of group 13 or 15 of the Periodic Table. Furthermore, the present invention relates to supported cocatalysts obtainable by such a process.

Supported cocatalyst comprising:
A) a support bearing functional groups,
B) trialkylaluminum and
C) a compound of the formula (I),

$(R^1)_x\text{-}A\text{-}(OH)_y$        (I)

Wherein in $R^1$ is a hydrocarbon group. A is an atom of group 13 or 15 of the Periodic Table, y is 1 or 2 and x is 3 minus y; are known in WO 2004/007570 and WO 2005/063831. The supported cocatalysts described in these documents have the drawback that in the powder form they are quite instable for an industrial use. In order to stabilize the catalyst it is suspended in a mixture of oil so that it can be also more easily metered in the reactor. However, according to the procedure used, the solvent-wet, supported catalysts powder is suspended in an oil mixture and then dried in vacuum. Due to the particularly features of this catalyst system this process gives rise to the drawback that the catalyst system loose activity and furthermore the catalyst powder is difficult to handle.

Therefore an object of the present invention is a process for the preparation of a catalyst paste comprising the following steps:
a) obtaining a slurry in an organic solvent containing at least:
  a1) a support bearing functional groups;
  a2) a trialkylaluminum of formula $(R^a)_3Al$ wherein $R^a$, equal to or different from each other is a $C_1$-$C_{20}$ hydrocarbon radical optional containing heteroatoms belonging to groups 13-17 of the periodic table of the elements;
  a3) a compound of formula (I)

$(R^1)_x\text{-}A\text{-}(OH)_y$        (I)

wherein:
  A is an atom of group 13 or 15 of the Periodic Table; $R^1$ equal to or different from each other, are $C_1$-$C_{40}$ hydrocarbon radicals optionally containing heteroatoms belonging to groups 13-17 of the periodic table of the elements; y is 1 or 2; x is 1 or 2; provided that x+y=3;
  a4) a transition metal organometallic compound;
b) washing the resulting slurry one or more times with oil.

Support bearing functional groups a1) is a support that is able to react with Broensted or Lewis acids or bases such as hydroxyl groups, primary and secondary amino groups mercapto groups, silanol groups, carboxyl groups, amido groups or imido groups, with hydroxyl groups. Preferred functional groups contain active hydrogen atoms. Active hydrogen atoms are hydrogen atoms able to react with Broensted bases such as sodium of potassium hydroxide. Example of functional groups can be hydroxyl groups or carboxyl acid groups.

Preferred supports are finely divided organic or inorganic solids which bear the appropriate functional groups. Examples are sheet silicates, inorganic oxides or finely divided functionalized polymer powders.

Inorganic oxides suitable as supports may be found among oxides of the elements of groups 2, 3, 4, 5, 13, 14, 15 and 16 of the Periodic Table of the Elements. Preference is given to oxides or mixed oxides of the elements calcium, aluminum, silicon, magnesium or titanium and also corresponding oxide mixtures. Other inorganic oxides which can be used on their own or in combination with the abovementioned oxidic supports are, for example, $ZrO_2$ or $B_2O_3$. Preferred oxides are silicon dioxide, in particular in the form of a silica gel or a pyrogenic silica, or aluminium oxide. A preferred mixed oxide is, for example, calcinated hydrotalcite, or silica oxide.

The support materials used preferably have a specific surface area in the range from 10 to 1 000 $m^2/g$, preferably from 50 to 500 $m^2/g$ and in particular from 200 to 400 $m^2/g$, and a pore volume in the range from 0.1 to 5 ml/g, preferably from 0.5 to 3.5 ml/g and in particular from 0.8 to 3.0 ml/g. The mean particle size of the finely divided supports is generally in the range from 1 to 500 μm, preferably from 5 to 350 μm and in particular from 10 to 100 μm.

The inorganic support can be subjected to a thermal treatment, e.g. for removing adsorbed water. Such a drying treatment is generally carried out at from 80 to 300° C. preferably from 100 to 200° C., and is preferably carried out under reduced pressure and/or in a stream of inert gas, for example nitrogen or argon. The inorganic support can also be calcinated, in which case the concentration of OH groups on the surface is adjusted and the structure of the solid may be altered by a treatment at a temperature ranging from 200 to 1000° C.

Further possible support materials are functionalized polymer supports, e.g. those based on polystyrenes or polyolefins such as polyethylene or polypropylene, whose functional groups may be, for example, ammonium or hydroxyl groups.

In the trialkylaluminium a2) of formula $(R^a)_3Al\ R^a$, equal to or different from each other, is preferably a $C_1$-$C_{20}$-haloalkyl, $C_1$-$C_{20}$-alkoxy, $C_6$-$C_{20}$-aryl, $C_6$-C20-haloaryl, $C_6$-$C_{20}$-aryloxy, $C_7$-$C_{20}$-arylalkyl, $C_7$-C20-haloarylalkyl, $C_7$-C20-alkylaryl or $C_7$-$C_{20}$-haloalkylaryl radical; more preferably $R^a$ is a $C_1$-$C_{10}$-alkyl radical; even more preferably $R^a$ is a methyl, ethyl n-propyl, isopropyl, n-butyl or isobutyl radical.

Preferably in the compound of formula (I) A is an atom of group 13 of the periodic table, more preferably A is a boron atom; $R^1$, equal to or different from each other, are preferably $C_1$-$C_{40}$-alkyl, $C_1$-$C_{40}$-haloalkyl, $C_1$-$C_{40}$-alkoxy, $C_6$-$C_{40}$-aryl, $C_6$-$C_{40}$-haloaryl, $C_6$-$C_{40}$-aryloxy, $C_7$-$C_{40}$-arylalkyl, $C_7$-$C_{40}$-haloarylalky, $C_7$-$C_{40}$-alkylaryl or $C_7$-$C_{40}$-haloalkylaryl radicals; more preferably $R^1$ is $C_6$-$C_{10}$ haloaryl, $C_7$-$C_{20}$ alkylaryl or $C_7$-$C_{20}$ haloalkylaryl radicals; such as pentafluorophenyl, pentachlorophenyl, tetrafluorophenyl, difluorophenyl radicals;

x is preferably 1 and y is preferably 2.

Transition metal organometallic compounds for use in the catalyst system paste in accordance with the present invention are compounds suitable as olefin polymerization catalysts by coordination or insertion polymerization wherein at least one ligand is an organic group. The class includes the metallocene compounds similarly and the late transition metal compounds known to be useful in coordination polymerization. These will typically include Group 4-10 transition metal compounds wherein at least one metal ligand can be abstracted by the catalyst activators.

Preferably the transition metal organometallic compound is a metallocene compound selected from those ones of formulas (II), (III) (IV) and (IV):

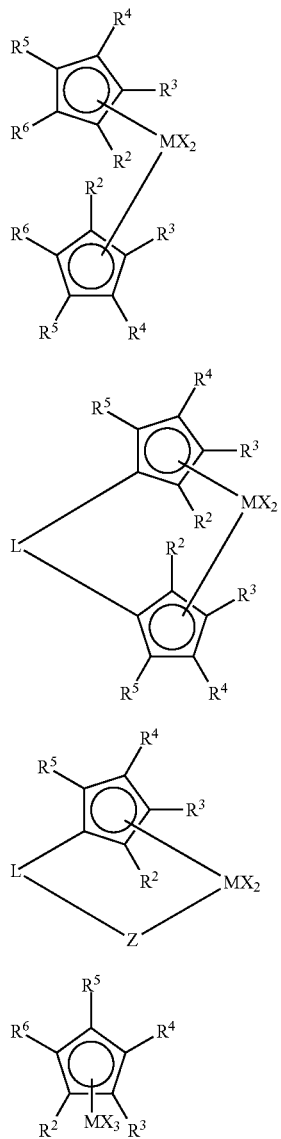

Wherein
M is titanium, zirconium, hafnium, vanadium, niobium, tantalum, chromium, molybdenum or tungsten, or an element of group 3 of the Periodic Table and the lanthanides, preferably M is titanium zirconium or hafnium;
X, equal to or different from each other, are fluorine, chlorine, bromine, iodine, hydrogen, $C_1$-$C_{10}$-alkyl, $C_2$-$C_{10}$-alkenyl, $C_6$-$C_{20}$-aryl, $C_7$-$C_{40}$-alkylaryl, $C_7$-$C_{40}$-arylalkyl, —$OR^6$ or —$NR^6{}_2$ radicals or two radicals X are joined to one another and together form, for example, a substituted or unsubstituted diene ligand, in particular a 1,3-diene ligand, or a biaryloxy group; preferably X is fluorine, chlorine, bromine, iodine or a $C_1$-$C_{10}$-alkyl radical such as methyl, ethyl, propyl or butyl radical;

$R^6$ equal to or different from each other, are $C_1$-$C_{20}$-alkyl, $C_6$-$C_{20}$-aryl $C_7$-$C_{40}$-arylalkyl, $C_7$-$C_{40}$-alkylaryl, fluoroalkyl or fluoroaryl each having from 1 to 16 carbon atoms in the alkyl radical and from 6 to 21 carbon atoms in the aryl radical;
L is an organic group bridging the two cyclopentadienyl moieties or Z and the cyclopentadienyl moiety; L is preferably a $C_1$-$C_{40}$ divalent hydrocarbon radical that can contain heteroatoms belonging to groups 13-17 of the periodic table of the elements; more preferably L is a group $(T(R^7)_2)_m$ wherein:

T, equal to or different from each other, is a carbon atom, a germanium atom or a silicon atom; preferably T is a silicon atom;

m is 1, 2 or 3 preferably m is 1;

$R^7$, equal to or different from each other, is hydrogen atom or a $C_1$-$C_{10}$-alkyl, $C_2$-$C_{10}$-alkenyl, $C_6$-$C_{20}$-aryl, $C_7$-$C_{40}$-alkylaryl, $C_7$-$C_{40}$-arylalkyl radicals optionally containing heteroatoms belonging to groups 13-17 of the Periodic Table of the Elements; preferably $R^7$ is hydrogen a $C_1$-$C_{20}$-alkyl or a $C_6$-$C_{20}$-aryl; more preferably $R^7$ is hydrogen, methyl or phenyl;

$R^2$, $R^3$, $R^4$, $R^5$ and $R^6$, equal to or different from each other, are hydrogen atoms, or linear or branched, saturated or unsaturated $C_1$-$C_{20}$-alkyl, $C_3$-$C_{20}$-cycloalkyl, $C_6$-$C_{40}$-aryl, $C_7$-$C_{40}$-alkylaryl or $C_7$-$C_{40}$-arylalkyl radicals, optionally containing heteroatoms belonging to groups 13-17 of the Periodic Table of the Elements; or two or more groups between $R^2$, $R^3$, $R^4$, $R^5$ and $R^6$ can form a saturated or unsaturated, 5 or 6 membered rings, said ring can bear $C_1$-$C_{20}$ alkyl radicals as substituents;

Z is an oxygen atom, a sulfur atoms or a group —$NR^6$ wherein $R^6$ is defined as above.

Preferably the metallocene compound has formula (VI)

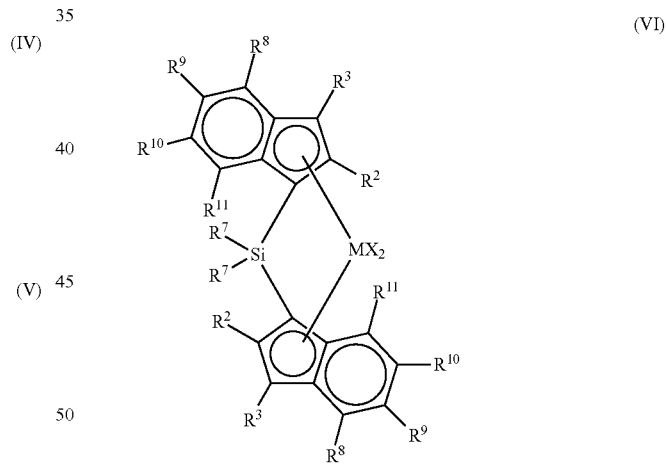

Wherein
M, X, R7, $R^2$ and $R^3$ has been defined above;
$R^8$, $R^9$, $R^{10}$, and $R^{11}$, equal to or different from each other, are hydrogen atoms, or linear or branched, saturated or unsaturated $C_1$-$C_{20}$-alkyl, $C_3$-$C_{20}$-cycloalkyl, $C_6$-$C_{40}$-aryl, $C_7$-$C_{40}$-alkylaryl or $C_7$-$C_{40}$-arylalkyl radicals, optionally containing heteroatoms belonging to groups 13-17 of the Periodic Table of the Elements; or two or more groups between $R^2$, $R^3$, $R^4$, $R^5$ and $R^6$ can form a saturated or unsaturated, 5 or 6 membered rings, said ring can bear $C_1$-$C_{20}$ alkyl radicals as substituents;

Preferably $R^3$ is a hydrogen atom and $R^2$, equal to or different from each other, is a linear or branched $C_1$-$C_{10}$-alkyl radical.

Oils used in step b) are inert compounds towards the catalyst system, that is to say oil cannot react with the catalyst components.

Oil is defined as a hydrocarbon or hydrocarbons mixture, which is liquid at room temperature and with a relatively low vapor pressure. The oil used in step b) can be selected from mineral oils, synthetic oils, with the proviso of being inert towards the catalyst components.

Preferred mineral oils are paraffinic white oils and, among these, vaseline oils. White oils are colorless, odorless, tasteless mixtures of saturated paraffinic and naphthenic hydrocarbons. These nearly chemically inert oils are virtually free of nitrogen, sulfur, oxygen and aromatic hydrocarbons. Suitable white oils are OB22 AT, Winog 70, Fina Vestan A 360B and Shell Ondina 64.

Synthetic oils can be obtained, for instance, by the oligomerization of decene, fractionating the product to an average of 30 carbon atoms and successive hydrogenation. It has been observed that a low viscosity of the oil contributes to maintain the particle size distribution of the catalytic particles during step b) of the present invention unchanged. As a consequence, the dynamic viscosity of the oil at 20° C. is preferably comprised between 2 and 400 Pascal×second (Pas), more preferably between 10 and 200 Pas.

With the process of the present invention it is possible to avoid the step of drying under vacuum the catalyst system. Due to the instability of the latter by using the process of the present invention therefore is possible to increase the activity of the catalyst paste and the time in which the catalyst paste can be stored without losing activity in a considerable way.

The components a1), a2), a3) and a4) are usually combined with one other in the presence of an organic solvent in. Suitable solvents are aromatic or aliphatic solvents, for example hexane, heptane, toluene or xylene, or halogenated hydrocarbons such as methylene chloride or halogenated aromatic hydrocarbons such as o-dichlorobenzene. Preferred solvent is toluene or xylene.

Preferably the support a1) is suspended in the solvent and then the other components a2), a3) and a4) are added. More preferably the support a1) is first reacted with trialkylaluminum a2) and then with the compound a3) and the reaction product is contacted with a4). However, it is also possible to react the support a1) with a2) and subsequently with a3) the reaction product is isolated and further contacted with a4).

The components are generally combined at temperatures in the range from −20° C. to 150° C., preferably from 0° C. to 80° C. The time for which the components are allowed to react with one another is generally from 1 to 76 hours. Preference is given to reaction times of from 2 to 48 hours, in particular from 6 to 24 hours and very particularly from 10 to 15 hours. If the support is first reacted with trialkylaluminum the time for which these components are allowed to react with one another is generally from 10 minutes to 48 hours. Preference is given to reaction times of from 20 minutes to 6 hours, in particular from 30 minutes to 1 hour. The time for which the reaction product of trialkylaluminum and the support a1) is subsequently allowed to react with the compound a2) is generally from 1 to 48 hours. Preference is given to reaction times of from 6 to 24 hours and in particular from 10 to 15 hours.

The molar ratio of trialkylaluminum a2) to functional groups of the support' a1) is usually from 0.05:1 to 100:1, preferably from 0.2:1 to 20:1, in particular from 1:1 to 5:1. The molar ratio of triethylaluminum a2) to compound a3) is generally from 0.05:1 to 20:1, preferably from 0.2:1 to 5:1, particularly preferably from 0.5:1 to 3:1, in particular from 0.5:1 to 2:1.

The molar ratio between the compound a3) and the transition metal organometallic compound is preferably between 10:1 to 200:1; preferably the boron/zirconium ratio is between 30:1 to 150:1; more preferably between 40:1 and 120:1; even more preferably between (45):1 and 110:1

After components a1, a2, a3 and a4 have been contacted in a slurry of an organic solvent the resulting slurry is preferably filtered so that most of the organic solvent is filtered off and then washed with oil. The washing procedure simply consists of adding a volume of oil to the slurry, under stirring and then the resulting slurry is filtered. The washing can be repeated one or more time until the organic solvent is removed.

The amount of oil ranges from 10 to 0.5 kg for 1 kg of solid material; preferably it ranges from 4 to 1 kg for 1 kg of solid material; more preferably it ranges from 3.5 to 1.5 kg for 1 kg of solid material.

The paste so obtained can be used as such or oil or a mixture containing oil and grease can be further added under stirring. In case a mixture of oil and grease is added the oil/grease ratio preferably range from 50:50 to 90:10; more preferably from 60:40 to 85:15, even more preferably from 70:30 to 85:15, for example a mixture of oil/grease 80:20 can be added to the paste obtained according to the process of the present invention in order to obtain the paste ready to be used.

A further object of the present invention is a catalyst paste obtainable with the above described process. The resulting catalyst paste, in fact, is much more intact than the paste obtained when the slurry is dried on vacuum other then the polymerization activity is increased. The process of obtaining the catalyst paste is more reliable when the removal of the solvent in vacuum is avoidable.

Grease can be further added to the catalyst paste according to the procedure commonly known in the art.

The catalyst paste object of the present invention can be used in polymerization processes of olefins in particular of alpha olefins. The polymerization can be carried out in a known manner, in solution, in bulk, in suspension, in the gas phase or in a supercritical medium in the customary reactors used for the polymerization of olefins. It can be carried out batchwise or preferably continuously in one or more stages. Suspension processes, stirred gas-phase processes or gas-phase fluidized-bed processes are all possible. As solvent or suspension medium, it is possible to use inert hydrocarbons, for example isobutane, or else the monomers themselves.

The catalyst paste of the present invention can be used for the polymerization of olefin in particular for the polymerization of alpha-olefins. Therefore a further object of the present invention is a process for preparing a alpha-olefin polymer comprising contacting under polymerization conditions one or more alpha-olefins of formula $CH_2=CHY$ wherein Y is hydrogen or a $C_1$-$C_{20}$ alkyl radical, in the presence of a catalyst paste as described above.

Non limitative examples of alpha-olefins of formula $CH_2=CHY$ are: ethylene, propylene, 1-butene, 1-hexene, 1-octene and 4-methyl-1-pentene, preferred alpha olefins are ethylene propylene and 1-butene.

The catalyst paste object of the present invention are is particularly suitable for the homo and copolymerization of propylene. Therefore a further object of the present invention is a process for the preparation of propylene copolymers comprising the step of contacting, under polymerization conditions, propylene with ethylene or one or more alpha olefins of formula $CH_2=CHY^1$, wherein $Y^1$ is a $C_2$-$C_{20}$ alkyl radical, in the presence of a catalyst paste described above.

Examples of alpha olefins of formula $CH_2=CHY^1$ are 1-butene, 1-hexene, 1-octene and 4-methyl-1-pentene, preferred alpha olefins are ethylene and 1-butene; more preferred alpha olefin is ethylene.

The catalyst paste of the present invention is also suitable for the preparation of copolymers of ethylene and higher alpha olefins, such as propylene, 1-butene, 1-hexene, 1-octene.

Further advantages and characteristics of the present invention will appear clear from the following examples, which are not to be intended to limit the scope of the invention.

EXAMPLES

The ligand of the Dimethylsilyl-(2-methyl, 4-phenyl-5,6-cyclopropanyl(indenyl)-2-i-propyl-p-t-butyl-4-pheny(indenyl)zirconium dimethyl has been synthesized according to WO 2005/058916, while the transmetallation of obtaining the dimethyl derivative has been carried out according to the description of U.S. Pat. No. 6,191,294

Comparative Example 1

1.9 kg of silica (Grace XPO2326, pre dried for 8 h at 130° C.) were suspended in 10 L of Toluene. 5.64 l of a 20 wt % solution of TEA (triethylaluminum) in hexane was added to this suspension, while the temperature was kept below 20° C. The reaction mixture was than stirred for 2 hours at ambient temperature. Following, a suspension of 806 g of pentafluorophenylboronic acid in 10 l of toluene was added, while the temperature was kept below 20° C., afterwards the reaction mixture was stirred at ambient temperature for 12 h. The reaction mixture was filtered and the solid residue washed 2 times with 10 l of toluene. After suspending the solid in 10 l of toluene, 27 g of Dimethylsilyl-(2-methyl, 4-phenyl-5,6-cyclopropanyl(indenyl)-2-i-propyl-p-t-butyl-4-pheny(indenyl)zirconium dimethyl dissolved in 10 l of toluene were added and stirred for 2 hours at ambient temperature. The reaction mixture was filtered and washed 2 times with 10 l of toluene. 34 kg of an oil/grease mixture (80% Kaydol, 20% Pioneer) was added to the solid and vacuum applied. The oil/grease catalyst mud was dried at 40° C. for 11 hours. Following the catalyst mud was transferred to an 80 l steel drum for storage.

Polymerization

A 14 L autoclave was charged with 20 ml TiBA (20 wt % solution in Exxsol), 300 mg of $H_2$ and 3.5 kg of liquid propylene. The autoclave was heated to 40° C. when 4 g of the catalyst mud (corresponds to 280 mg of neat catalyst powder) described in the comparative example was injected. The temperature was maintained for 10 minutes and after that increased to 65° C. and maintained for another 1 h. The polymerization was stopped by venting off the autoclave. 1680 g of polymer was obtained, which correspond to an activity of 6.0 kg/gh.

Example 1

Catalyst Preparation According to the Invention 2.0 kg of silica (Grace XPO2326, pre dried for 8 h at 130° C.) were suspended in 10 L of Toluene. 1.83 kg of a 50 wt % solution of TEA (triethylaluminum) in hexane was added to this suspension, while the temperature was kept below 20° C. The reaction mixture was than stirred for 1 hour at ambient temperature. Following, a suspension of 848 g of pentafluorophenylboronic acid in 10 l of toluene was added, while the temperature was kept below 20° C., afterwards the reaction mixture was stirred at ambient temperature for 12 h. The reaction mixture was filtered and the solid residue washed 2 times with 10 l of toluene. After suspending the solid in 20 l of toluene, 30 g of Dimethylsilyl-(2-methyl, 4-phenyl-5,6-cyclopropanyl(indenyl)-2-i-propyl-p-t-butyl-4-pheny(indenyl)zirconium dimethyl dissolved in 3 l of toluene were added and stirred for 2 hours at ambient temperature. The reaction mixture was filtered and washed 1 time with 10 l of toluene. 10 kg of Kaydol mineral oil was added and the suspension was stirred for 30 min at 40° C. The oil/toluene mixture was filtered and another 5 kg of Kaydol mineral oil was added. The suspension was again stirred for 30 min at 40° C. and than filtered. 27 kg of an oil/grease mixture (80% Kaydol, 20% Pioneer) was added to the solid and stirred for 30 min at ambient temperature. Following the catalyst mud was transferred to an 80 l steel drum for storage.

Polymerization

A 14 L autoclave was charged with 20 ml TiBA (20 wt % solution in Exxsol), 300 mg of $H_2$ and 3.5 kg of liquid propylene. The autoclave was heated to 40° C. when 1.47 g of the catalyst mud (corresponds to 127 mg of neat catalyst powder) described in the comparative example was injected. The temperature was maintained for 10 minutes and after that increased to 65° C. and maintained for another 1 h. The polymerization was stopped by venting off the autoclave. 2290 g of polymer was obtained, which correspond to an activity of 18.1 kg/gh.

By comparing example 1 and comparative example 1 it is evident that the polymerization activity of the catalyst system prepared according to the present invention is considerably higher.

The invention claimed is:

1. A process for the preparation of a catalyst paste comprising the following steps:
   a) obtaining a slurry in an organic solvent comprising:
      a1) a support bearing functional groups;
      a2) a trialkylaluminum of formula $(R^a)_3Al$ wherein $R^a$, equal to or different from each other is a $C_1$-$C_{20}$ hydrocarbon radical optionally containing heteroatoms belonging to groups 13-17 of the periodic table of the elements;
      a3) a compound of formula (I):

$$(R^1)_x\text{-A-}(OH)_y \qquad (I)$$

wherein:
      A is an atom of group 13 or 15 of the Periodic Table; $R^1$ equal to or different from each other, are $C_1$-$C_{40}$ hydrocarbon radicals optionally containing heteroatoms belonging to groups 13-17 of the periodic table of the elements; y is 1 or 2; x is 1 or 2; provided that x+y=3; and
      a4) a transition metal organometallic compound; and
   b) washing the resulting slurry at least one time with oil.

2. The process according to claim 1 wherein the support comprises hydroxyl groups or carboxyl acid groups.

3. The process according to claim 1 wherein in the trialkylaluminium, $R^a$ is a $C_1$-$C_{10}$-alkyl radical.

4. The process according to claim 1 wherein in the compound of formula (I), A is a boron atom, $R^1$ is selected from the group consisting of $C_6$-$C_{10}$ haloaryl, $C_7$-$C_{20}$ alkylaryl and $C_7$-$C_{20}$ haloalkylaryl radicals; x is 1 and y is 2.

5. The process according to claim 1 wherein the transition metal organometallic compound has formula (VI):

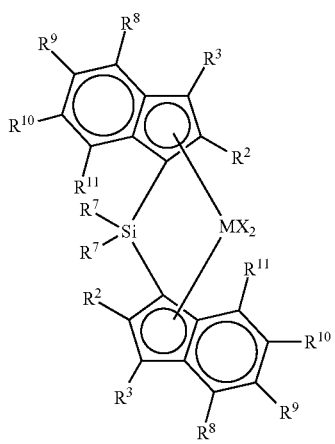

(VI)

wherein

M is titanium, zirconium, hafnium, vanadium, niobium, tantalum, chromium, molybdenum, tungsten, or an element of group 3 of the Periodic Table and the lanthanides;

X, equal to or different from each other, are fluorine, chlorine, bromine, iodine, hydrogen, $C_1$-$C_{10}$-alkyl, $C_2$-$C_{10}$-alkenyl, $C_6$-$C_{20}$-aryl, $C_7$-$C_{40}$-alkylaryl, $C_7$-$C_{40}$-arylalkyl, —$OR^6$ or —$NR^6_2$ radicals or two radicals X are joined to one another and together form, a substituted or unsubstituted diene ligand;

$R^2$ and $R^3$, equal to or different from each other, are hydrogen atoms, or linear or branched, saturated or unsaturated $C_1$-$C_{20}$-alkyl, $C_3$-$C_{20}$-cycloalkyl, $C_6$-$C_{40}$-aryl, $C_7$-$C_{40}$-alkylaryl or $C_7$-$C_{40}$-arylalkyl radicals, optionally containing heteroatoms belonging to groups 13-17 of the Periodic Table of the Elements; or two or more groups between $R^2$, $R^3$, $R^4$, $R^5$ and $R^6$ can form a saturated or unsaturated, 5 or 6 membered rings, said ring can bear $C_1$-$C_{20}$ alkyl radicals as substituents;

$R^7$, equal to or different from each other, is hydrogen atom or a $C_1$-$C_{10}$-alkyl, $C_2$-$C_{10}$-alkenyl, $C_6$-$C_{20}$-aryl, $C_1$-$C_{40}$-alkylaryl, $C_7$-$C_{40}$-arylalkyl radicals optionally containing heteroatoms belonging to groups 13-17 of the Periodic Table of the Elements $R^8$, $R^9$, $R^{10}$, and $R^{11}$, equal to or different from each other, are hydrogen atoms, or linear or branched, saturated or unsaturated $C_1$-$C_{20}$-alkyl, $C_3$-$C_{20}$-cycloalkyl, $C_6$-$C_{40}$-aryl, $C_7$-$C_{40}$-alkylaryl or $C_7$-$C_{40}$-arylalkyl radicals, optionally containing heteroatoms belonging to groups 13-17 of the Periodic Table of the Elements; or two or more groups between $R^2$, $R^3$, $R^4$, $R^5$ and $R^6$ can form a saturated or unsaturated, 5 or 6 membered rings, said ring can bear $C_1$-$C_{20}$ alkyl radicals as substituents.

6. The process according to claim 1 wherein the support is first reacted with the trialkylaluminum and then with the compound of formula (I), thereby forming a reaction product, with the reaction product then being contacted with the transition metal organometallic compound.

7. The process according to claim 1 further comprising a molar ratio between the compound of formula (I) and the transition metal organometallic compound of between 10:1 to 200:1.

8. A catalyst paste obtained from the process of claim 1.

9. A process comprising polymerizing olefins with the catalyst paste of claim 8.

10. The process of claim 5 wherein M is titanium zirconium or hafnium.

* * * * *